United States Patent
Brombach et al.

(10) Patent No.: US 11,885,314 B2
(45) Date of Patent: Jan. 30, 2024

(54) METHOD FOR OPERATING A CONVERTER, IN PARTICULAR OF A WIND POWER INSTALLATION

(71) Applicant: Wobben Properties GmbH, Aurich (DE)

(72) Inventors: Johannes Brombach, Berlin (DE); Ingo MacKensen, Aurich (DE); Menko Bakker, Aurich (DE)

(73) Assignee: Wobben Properties GmbH, Aurich (DE)

(*) Notice: Subject to any disclaimer, the term of this patent is extended or adjusted under 35 U.S.C. 154(b) by 0 days.

(21) Appl. No.: 17/213,901

(22) Filed: Mar. 26, 2021

(65) Prior Publication Data

US 2021/0301787 A1    Sep. 30, 2021

(30) Foreign Application Priority Data

Mar. 30, 2020 (EP) .................................... 20166582

(51) Int. Cl.

| | | |
|---|---|---|
| *F03D 9/00* | (2016.01) | |
| *F03D 9/25* | (2016.01) | |
| *H02P 101/15* | (2016.01) | |

(52) U.S. Cl.
CPC .......... *F03D 9/257* (2017.02); *H02P 2101/15* (2015.01)

(58) Field of Classification Search
CPC .......... F03D 9/257; H02P 9/006; H02P 9/107; H02P 2101/15; H02H 9/02; H02M 1/32; H02M 1/325; H02J 2300/28; H02J 3/381; H02J 3/001; Y02E 10/72; Y02E 10/76
See application file for complete search history.

(56) References Cited

U.S. PATENT DOCUMENTS

| | | | | | |
|---|---|---|---|---|---|
| 4,184,186 | A | * | 1/1980 | Barkan | H02H 3/023 361/57 |
| 5,109,185 | A | * | 4/1992 | Ball | H02M 7/5387 330/10 |
| 9,093,924 | B2 | * | 7/2015 | Gupta | H02M 7/53875 |
| 11,031,784 | B2 | * | 6/2021 | Achilles | H02J 3/16 |
| 11,067,059 | B2 | * | 7/2021 | Brombach | F03D 7/048 |

(Continued)

FOREIGN PATENT DOCUMENTS

| | | |
|---|---|---|
| CN | 110266048 A | 9/2019 |
| CN | 110476314 A | 11/2019 |

(Continued)

*Primary Examiner* — Julio C. Gonzalez
(74) *Attorney, Agent, or Firm* — Seed IP Law Group LLP

(57) ABSTRACT

The present disclosure relates to a method for operating a converter on a three-phase electrical power supply grid, comprising the following steps: operating the converter in a first operating mode by means of a control unit for generating an output current, wherein the converter in the first operating mode operates in such a way as to apply a voltage to the electrical power supply grid; detecting a grid fault on the electrical power supply grid by means of a detection means during the first operating mode; limiting the output current of the converter by means of current limitation when a grid fault on the electrical power supply grid has been detected during the first operating mode, in particular in such a way that the output current of the converter falls below a predetermined maximum current or substantially corresponds thereto.

15 Claims, 4 Drawing Sheets

(56) References Cited

U.S. PATENT DOCUMENTS

2020/0059178 A1    2/2020   Brombach
2020/0176993 A1*   6/2020   Brombach .............. H02J 3/381

FOREIGN PATENT DOCUMENTS

| | | | |
|---|---|---|---|
| CN | 110476315 A | 11/2019 | |
| CN | 110754026 A | 2/2020 | |
| DE | 102006049337 A1 | 7/2008 | |
| DE | 102014016664 A1 | 5/2016 | |
| DE | 102018115794 A1 | 1/2020 | |
| GB | 2432267 A | 5/2007 | |
| PL | 207442 B1 * | 4/2002 | |
| WO | WO 2018072781 A1 | 4/2018 | |
| WO | 2018/202772 A1 | 11/2018 | |
| WO | WO-2018224596 A1 * | 12/2018 | ............... F03D 9/00 |
| WO | WO-2018228901 A1 * | 12/2018 | ............... F03D 7/00 |

* cited by examiner

METHOD FOR OPERATING A CONVERTER, IN PARTICULAR OF A WIND POWER INSTALLATION

BACKGROUND

Technical Field

The present disclosure relates to a method for operating a converter, in particular of a wind power installation, and to a wind power installation comprising such a converter.

Description of the Related Art

Owing to the increasing displacement of conventional power plants driven by a synchronous generator by regenerative, converter-based generating units, conventional synchronous generators are losing ever more influence within the electrical power supply grid.

Owing to this decrease in the number of synchronous generators, there is likewise a decrease in the conventional centrifugal masses stabilizing the electrical power supply grid.

Since the effects of such a change within the electrical power supply grid are virtually unresearched, there are considerations to operate the converters of the regenerative generating units such that they operate in such a way as to impress a voltage to the electrical power supply grid and/or operate as a conventional synchronous machine.

In other words, the converters are intended to act on the electrical power supply grid as a conventional synchronous machine and/or emulate the behaviour of a conventional synchronous machine, in particular without in the process losing any of the advantages of the power converter technology.

Such converters operated in this way are referred to as voltage-impressing or as a virtual synchronous machine.

One disadvantage with the previously known voltage-impressing or synchronous machine-emulating methods consists in that they are not designed for any grid faults occurring on the electrical power supply grid.

BRIEF SUMMARY

One or more embodiments are directed to a closed-loop control method for managing grid faults, such as for voltage-impressing or synchronous machine-emulating methods.

One embodiment proposes a method for operating a converter on a three-phase electrical power supply grid, comprising the following steps: operating the converter in a first operating mode by means of a controller for generating an output current, wherein the converter in the first operating mode operates in such a way as to impress a voltage to the electrical power supply grid; detecting a grid fault on the electrical power supply grid by means of a detection means during the first operating mode; limiting the output current of the converter by means of current limitation when a grid fault on the electrical power supply grid has been detected during the first operating mode, in particular in such a way that the output current of the converter falls below a predetermined maximum current or substantially corresponds thereto.

For this purpose, the converter is in the form of a converter, in particular an AC converter, of a wind power installation and/or of an electrical store and has in particular a converter output, which is connectable to a three-phase electrical power supply grid and is designed to provide an output current at the converter output or to inject an output current into the three-phase electrical power supply grid.

In a preferred embodiment, the converter has a controller, which is designed to drive the converter in such a way that the converter, at the three-phase electrical power supply grid, in the steady state appears to be dynamic like an electromechanical synchronous machine.

The converter is therefore preferably operated as a virtual synchronous machine. For example, the controller for this purpose drives the converter by means of a tolerance band method.

The converter or the controller preferably further has a multiplicity of operating modes, wherein a first operating mode operates the converter such that the converter operates in such a way as to impress a voltage to the electrical power supply grid.

Preferably, the converter or the controller also has a second operating mode, wherein the converter in the second operating mode operates in such a way as to impress a current on the electrical power supply grid.

The converter or the controller are therefore preferably at least designed to be operated in a first and a second operating mode, in particular in order to provide an output current at a converter output which can be injected into the electrical power supply grid. For this purpose, the converter or the controller can have, for example, closed-loop power control, which is intended to operate the converter in such a way as to impress a voltage, in particular to the electrical power supply grid.

Voltage-impressing or a voltage-impressing converter (grid forming inverter) are herein understood to mean in particular methods and/or converters which are configured and/or designed to make available a defined voltage having a preset amplitude and frequency on the electrical power supply grid, in particular in such a way that they operate substantially as a voltage source, i.e., preferably have a low series impedance with respect to the electrical power supply grid. The object of the converter therefore consists substantially in providing a determined voltage and/or frequency on the electrical power supply grid, i.e., forming a so-called grid former or slack bus. A voltage-impressing converter can therefore provide a voltage even on no load, or without in the process injecting current and/or power. As a result, in particular a so-called grid angle can be provided, which in particular enables provision of a correct phase angle for other grid users, in particular generating units.

Current-impressing or a current-impressing converter (grid following inverter) are understood herein to mean in particular methods and/or converters which are configured and/or designed to inject an electrical power into the electrical power supply grid in such a way that they operate substantially as a current source, i.e., preferably have a high parallel impedance with respect to the electrical power supply grid. The object of the converter therefore consists substantially in injecting a fixed active and/or reactive power into the electrical power supply grid, i.e., forming a so-called PQ bus.

If, in the first operating mode, in which the converter operates in such a way as to impress a voltage to the electrical power supply grid, a grid fault is now detected by means of a detection means, it is proposed to limit the output current of the converter.

Grid faults are in this case particularly severe faults within the electrical power supply grid, at least a fault from the following list: voltage dip, sudden phase shift, severe frequency gradients and/or a combination of these three faults.

Grid faults are understood here in particular to mean events which are preceded locally or globally by a significant lack of equilibrium which, without immediate support, results in a severe change in the phase, voltage or frequency.

It is therefore in particular proposed to categorize all of the faults on the electrical power supply grid which lead or would lead to an, in particular instantaneous or sudden, increase in the output current as grid faults.

In order to detect grid faults on the electrical power supply grid, in particular during the first operating mode, preferably detection means are used which are designed to detect a power increase at the converter output. Such detection means can also be referred to as power detection and are preferably part of the converter. Preferably, such power detection comprises at least current detection and voltage detection.

If a grid fault on the electrical power supply grid has been detected during the first operating mode, it is proposed to limit the output current of the converter, i.e., the current which is intended to be or is injected into the electrical power supply grid.

The limiting of the output current in this case takes place in particular by means of current limitation. The current limitation for this purpose can be implemented, for example, in the form of a hysteresis controller within a controller of the converter.

The output current is in this case preferably limited by means of the current limitation in such a way that the output current falls below a predetermined maximum current or substantially corresponds thereto. The current limitation is therefore in particular designed to limit the output current of the converter in such a way that the output current does not exceed a predetermined maximum current.

The predetermined maximum current is preferably determined or set depending on the physical properties of the semiconductors of the converter, for example by means of current/time integrals or a power loss model of the switching operations of the semiconductor.

However, it is also possible for the predetermined maximum current to be preset by the grid operator, for example depending on a short-circuit current ratio at the point of common coupling of the converter.

Preferably, the current limitation is performed in the steady state, in particular by means of an absolute value, and/or dynamically, in particular by means of a reference system.

The current limitation is preferably implemented in the controller of the converter, for example by means of an electrical circuit or by means of control-engineering means, such as software, for example.

The controller generates, for example, a setpoint current value for the converter, in particular a setpoint current value for a tolerance band of the converter.

The setpoint current value is passed via the current limitation, which has, for example, an upper limit and a lower limit, i.e., an absolute value as upper limit and an absolute value as lower limit. The upper limit can also be referred to as the maximum setpoint current value and the lower limit can also be referred to as the minimum setpoint current value. If the setpoint current value exceeds, for example, the maximum setpoint current value of the current limitation, the current limitation only outputs the maximum setpoint current value as setpoint current value. The current limitation therefore limits setpoint current values for the converter to a maximum or minimum.

Steady-state current limitation is therefore understood to mean in particular a controller for limiting an output current of a converter:
  whose output variable only changes when its input variable changes; and
  which does not have its own dynamics or does not perform its own movement, which is caused, for example, by energy stores.

Generally, such steady-state controllers are described by algebraic equations.

The steady-state current limitation in this case in particular has the object of keeping the instantaneous output current value of the output current of the converter to a value. In this case, the value is constant over a half-cycle, i.e., is in the steady state.

The setpoint current value can, however, also be adjusted dynamically using a reference system or corrected thereto.

Dynamic current limitation is therefore understood to mean in particular a controller for limiting an output current of a converter:
  whose output variable changes even when its input variable does not change; and
  which has its own dynamics or performs its own movement, which is caused, for example, by internal energy stores which are charged and discharged.

Generally, such dynamic controllers are described by differential equations.

The dynamic current limitation therefore has in particular a variable limit value, preferably over a half-cycle, in order in particular to keep a sinusoidal current characteristic in the ideal case.

Preferably, the current limitation is performed in the steady state, in particular by means of an absolute value, and the method further comprises at least the following step: measuring an active component of the output current.

It is therefore in particular also proposed that the current limitation operates by means of an absolute value which is set depending on a detected active component of an output current of the converter.

Preferably, the current limitation is performed in the steady state, in particular by means of an absolute value, and the method further comprises at least the following step: measuring a distortive reactive power of the output current.

For this purpose, for example, a detection means is arranged at the output of the converter, and the detection means is designed to detect a distortive reactive power.

The distortive reactive power is in particular defined as the product of the rms value of the sum of all of the harmonic currents of the output current and the rms value of the fundamental voltage, for example as $$D = V \cdot I_v = V \cdot \sqrt{\sum_{i=2}^{\infty} I_i^2}.$$

where D is the distortive reactive power, V is the rms value of the voltage, his the distortive reactive current, and h is the rms value of the fundamental current and the harmonic currents.

The distortive reactive power therefore reproduces in particular the reactive power of all of the harmonics of the output current.

Preferably, the distortive reactive power is used in particular to return the converter, after the response of the current limitation, ordered again, to voltage impressing.

Furthermore, however, a distortive reactive current can also be used in place of the distortive reactive power in order to return the converter, after the response of the current limitation, ordered again, to voltage impressing.

The method therefore in particular also comprises the following step:

returning to voltage impressing after the limitation of the output current, in particular using a distortive reactive current.

Alternatively or in addition, a voltage phasor can also be accelerated or decelerated in order to regulate a distortive reactive current of the output current to zero.

For example, the output current of the converter is set via a closed-loop power control which is performed dynamically. If the output power now exceeds, owing to the current limitation, a preset setpoint power value, for example the phasor of the closed-loop power control is decelerated in order to set an appropriate voltage angle. In the case where the preset setpoint power value is undershot, the phasor of the closed-loop power control is accelerated, in particular in order to set an appropriate voltage angle.

It is therefore in particular also proposed that the converter comprises dynamic closed-loop power control comprising a voltage phasor, and the method further comprises the following step:

accelerating and/or decelerating the voltage phasor, in particular in order to set a voltage angle.

Alternatively or in addition, a voltage phasor can also be accelerated or decelerated in order to set a setpoint active power value.

The method therefore in particular also comprises the following step:

returning to voltage impressing after the limitation of the output current, in particular using a distortive reactive power and/or a setpoint active power value.

Preferably, the current limitation is performed dynamically, in particular by means of a reference system, and the method further comprises the following step: latching a controller in a closed-loop output current control for the first operating mode, in particular after an overload and/or depending on at least one predetermined criterion.

It is therefore in particular proposed that the method comprises at least a first criterion in order to change the operating mode and a second criterion in order to change the operating mode back again. This can take place, for example, by means of a hysteresis controller, which comprises a first and a second criterion in order to change back and forth between operating modes.

The method therefore in particular also comprises the following step:

resynchronizing the converter by means of a first and a second criterion.

Alternatively or in addition, a phase and/or an amplitude of an output clamping voltage at the converter can also be detected, in particular in order to resynchronize the converter.

Alternatively or in addition, a voltage reference system or a voltage phasor can also be set to a detected voltage, in particular to a detected output clamping voltage, in particular in order to resynchronize the converter.

Alternatively or in addition, a setpoint power value can also be set by means of closed-loop power control, in particular by means of accelerating or decelerating a voltage phasor, in particular in order to resynchronize the converter.

Another embodiment proposes an apparatus for injecting electrical energy into a three-phase electrical power supply grid, in particular a converter, preferably of a wind power installation and/or an electrical store, at least comprising a controller, which is designed to perform a method as described above and/or below.

Another embodiment proposes a wind power installation and/or an electrical store, at least comprising an apparatus as described above or below for injecting electrical energy and/or a controller, which is designed to perform a method as described above and/or below.

BRIEF DESCRIPTION OF THE SEVERAL VIEWS OF THE DRAWINGS

The present disclosure will now be explained in more detail below by way of example and using exemplary embodiments and with reference to the attached figures, wherein the same reference symbols are used for identical or similar assemblies.

DETAILED DESCRIPTION

Figure 1:
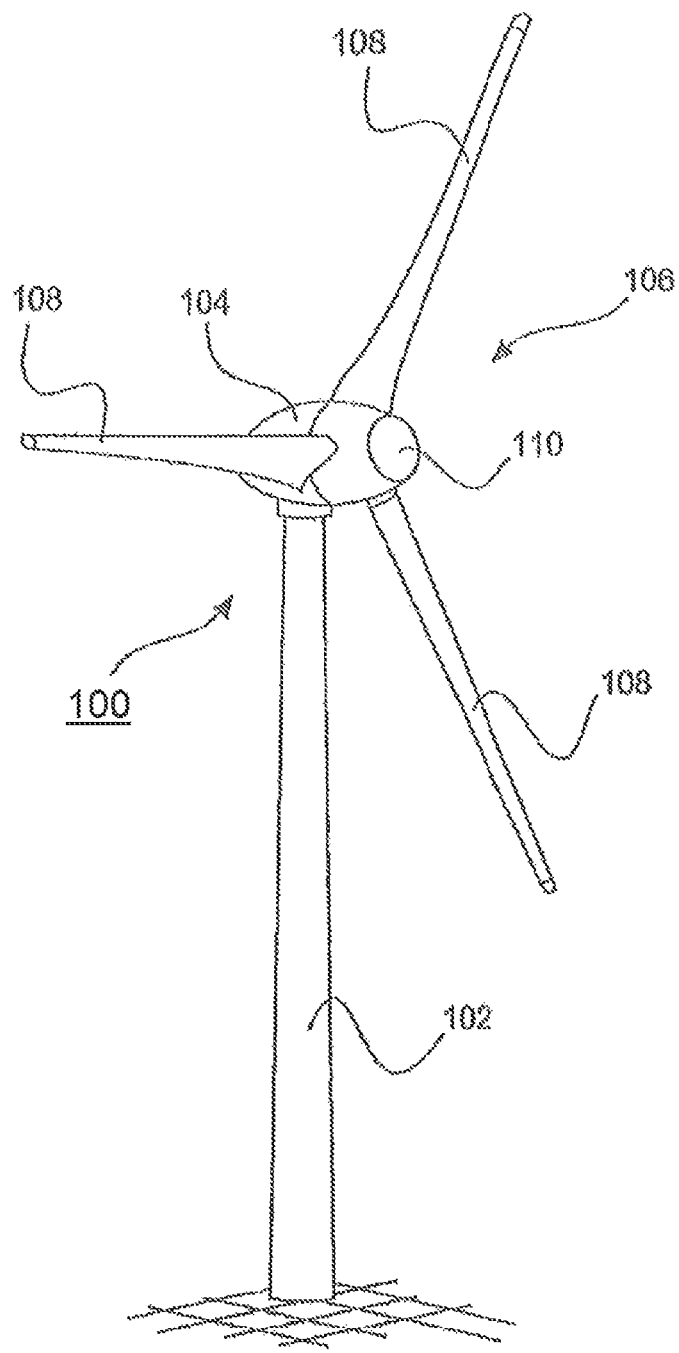
FIG. 1 shows a schematic view of a wind power installation in accordance with one embodiment.

FIG. 1 shows a schematic view of a wind power installation 100 in accordance with one embodiment.

The wind power installation 100 has, for this purpose, a tower 102 and a nacelle 104. An aerodynamic rotor 106 having three rotor blades 108 and a spinner 110 is arranged on the nacelle 104. The rotor 106 is set in rotary motion by the wind during operation and thereby drives a generator in the nacelle 104.

The generator is connected, by means of a converter, to an electrical grid, for example a wind farm grid or an electrical power supply grid in order to inject a three-phase alternating current.

The wind power installation for this purpose comprises a controller as described above or below.

Figure 2:
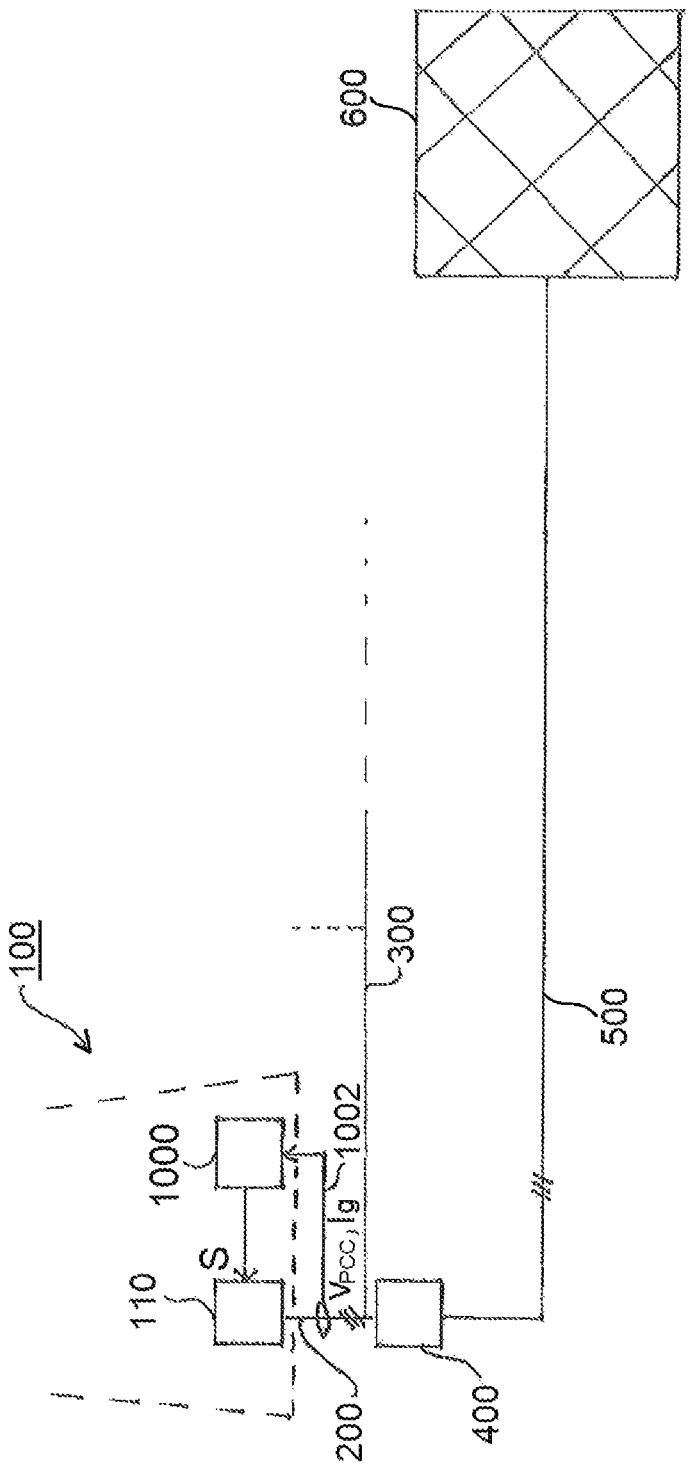
FIG. 2 shows a schematic view of a wind power installation at a point of common coupling in accordance with one embodiment.

FIG. 2 shows a schematic view of a wind power installation 100 at a point of common coupling 200 of an electrical power supply grid 600 in accordance with one embodiment.

The wind power installation 100, for example as shown in FIG. 1, has a converter 110 and a controller 1000.

The controller 1000 is designed to implement a method as described above or below and in particular to drive the converter 110 by means of a control value S in such a way that the converter 110 operates in such a way as to impress a voltage to the electrical power supply grid 600.

For this purpose, the controller 1000 has, inter alia, voltage and/or current detection circuitry 1002, which is designed to detect a three-phase voltage $V_{PCC}$ at the point of common coupling 200 and/or the current $I_g$ generated by the converter.

The current $I_g$ generated by the converter 110 is injected at the point of common coupling 200 into a wind farm grid 300, for example, which connects a plurality of wind power installations to one another.

The wind farm grid 300 is further connected to an electrical power supply grid 600 via a transformer 400 and a connecting line 500.

Figure 3A:
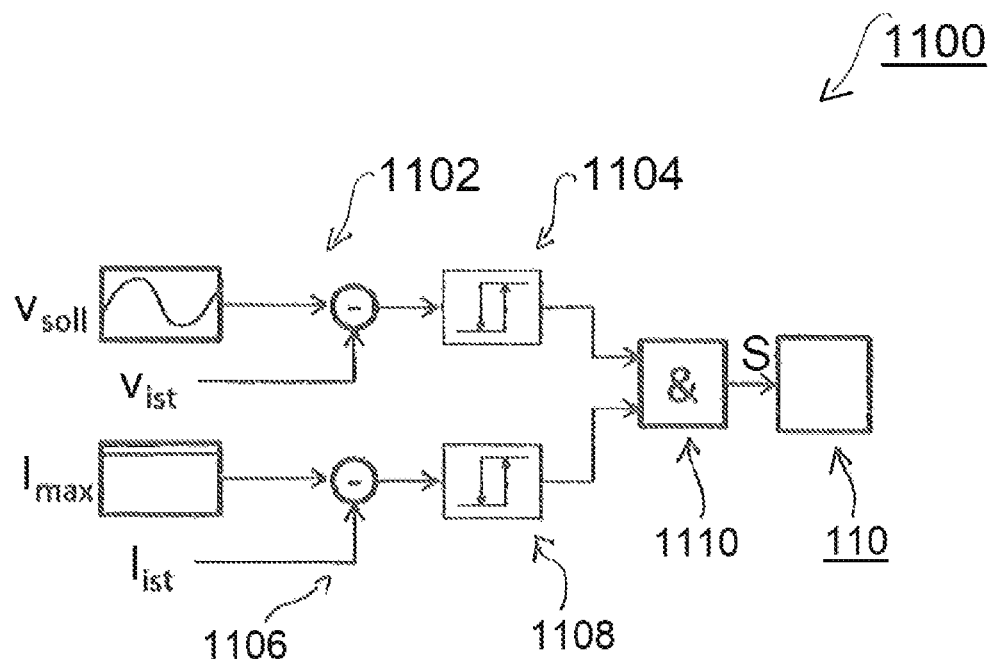
FIG. 3A shows a controller of a converter in accordance with one embodiment.

FIG. 3A shows a controller 1100 of a converter 110 in accordance with one embodiment.

The controller 1100 comprises voltage adjustment circuitry 1102 and a hysteresis controller 1104 and current adjustment circuitry 1106 and a hysteresis controller 1108, which are combined by means of a gate 1110 for a control value S in order to drive the converter 110.

The voltage adjustment circuitry 1102 includes comparative circuitry and compares a detected actual voltage $V_{ist}$, for example the voltage $V_{PCC}$ at the point of common coupling, with a setpoint voltage value $V_{soll}$. The difference between said values is passed via the hysteresis controller 1104 to the gate 1110.

The current adjustment circuitry 1106 includes comparative circuitry and compares an actual current $I_{ist}$ with a maximum current $I_{max}$ and limits said current, if necessary. The current adjustment circuitry 1106 is therefore in the form of steady-state current limitation, whose output is likewise passed via a hysteresis controller 1108 to the gate 1110.

The gate 1110 determines a corresponding control value for the converter 110 from the voltage and the current adjustment.

The controller 1100 therefore has in particular voltage impressing with steady-state current limitation.

Figure 3B:
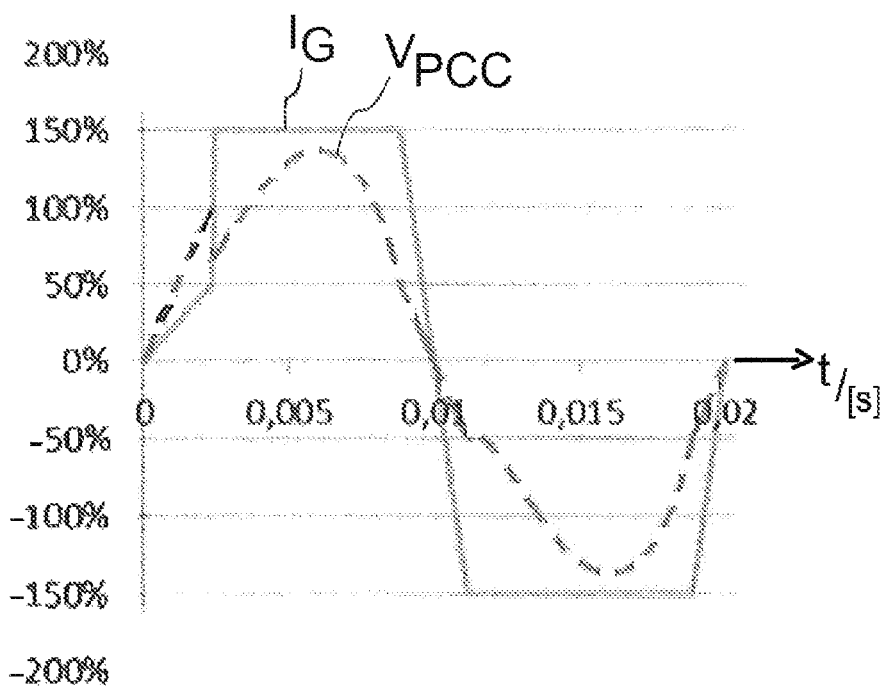
FIG. 3B shows the behaviour of the converter in accordance with the embodiment.

FIG. 3B shows the behaviour of the converter 110 comprising a controller 1100, in particular as in FIG. 3A, which has steady-state current limitation.

The dashed line shows the characteristic of the voltage $V_{PCC}$ at the point of common coupling with a sudden phase shift of approximately 30° in 0.002 seconds.

The solid line shows the characteristic of the current $I_g$ generated by the converter.

Owing to the sudden phase shift in the voltage, the current generated by the converter increases suddenly and is limited by the current limitation at 150 percent of the rated current.

The actual current limitation in this case takes place both in the positive and in the negative direction.

Figure 4A:
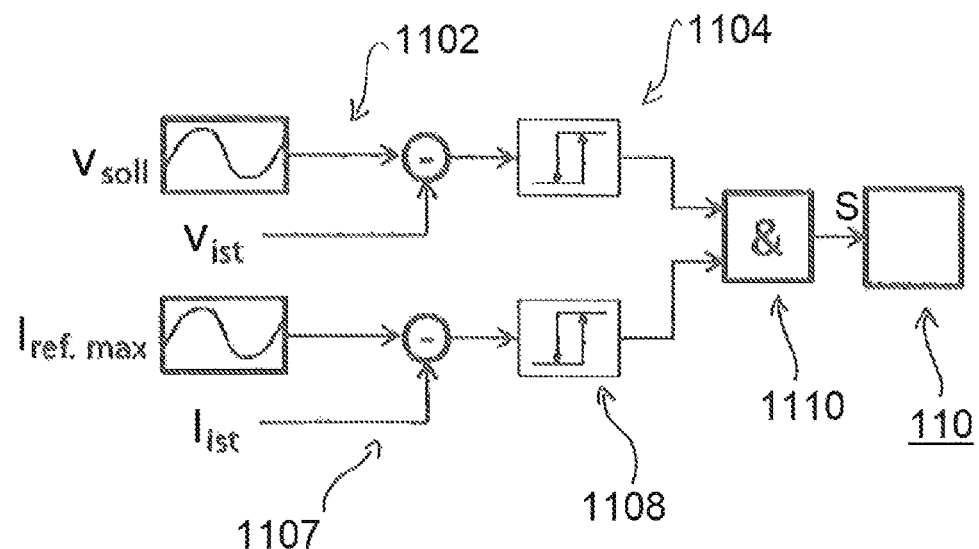
FIG. 4A shows a controller of a converter in accordance with a further embodiment.

FIG. 4A shows a controller 1100 of a converter 110 in accordance with another embodiment.

The controller 1100 comprises voltage adjustment circuitry 1102 comprising a hysteresis controller 1104 and current adjustment circuitry 1106 comprising a hysteresis controller 1108, which are combined by means of a gate 1110 for a control value S in order to drive the converter 110.

The voltage adjustment circuitry 1102 includes comparative circuitry and compares a detected actual voltage $V_{ist}$, for example the voltage $V_{PCC}$ at the point of common coupling, with a setpoint voltage value $V_{soll}$. The difference between said values is passed via the hysteresis controller 1104 to the gate 1110.

The current adjustment circuitry 1106 includes comparative circuitry and compares an actual current $I_{ist}$ with a maximum reference current $I_{ref.max}$ and limits said current. The current adjustment circuitry 1106 is therefore in the form of dynamic current limitation using a reference phasor which is likewise passed via a hysteresis controller.

The current limitation is therefore in particular a rotating current reference phasor or a reference system.

The gate 1110 determines from the voltage and the current adjustment a corresponding control value for the converter 110.

The controller 1100 therefore has voltage impressing with dynamic current limitation.

Figure 4B:
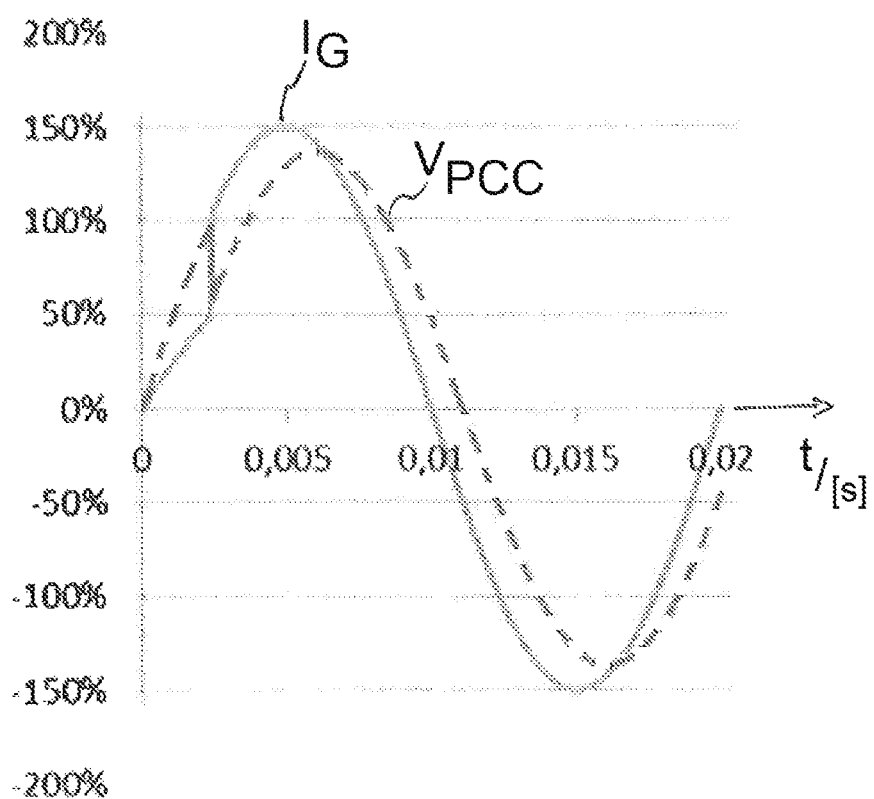
FIG. 4B shows the behaviour of the converter in accordance with the further embodiment.

FIG. 4B shows the behaviour of the converter 110 comprising a controller 1100, in particular as in FIG. 4A, which has a dynamic current limitation.

The dashed line shows the characteristic of the voltage $V_{PCC}$ at the point of common coupling with a sudden phase shift of approximately 30° in 0.002 seconds.

The solid line shows the characteristic of the current $I_g$ generated by the converter.

Owing to the sudden phase shift in the voltage, the current generated by the converter increases suddenly and is limited by the current limitation dynamically and in particular sinusoidally.

The current limitation in this case takes place in particular both in the positive and in the negative direction.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited.

The invention claimed is:

1. A method comprising:
   operating an inverter on a three-phase electrical power supply grid, the operating comprising:
   operating the inverter in a first operating mode by a controller for generating an output current for feeding into the three-phase electrical power supply grid, wherein the inverter in the first operating mode operates to control the voltage of the three-phase electrical power supply grid by applying the output current having a particular amplitude, a particular phase angle, and a particular frequency to the three-phase electrical power supply grid;
   detecting a grid fault on the three-phase electrical power supply grid during the first operating mode, wherein the grid fault is indicative of a reduced voltage in the three-phase electrical power supply grid;
   in response to detecting the grid fault, continuing to operate in the first operating mode and limiting the output current of the inverter, wherein limiting the output current comprises generating the output current dynamically by a reference system; and
   setting a voltage reference system to a detected output clamping voltage.

2. The method according to claim 1, wherein limiting the output current comprises generating the output current at a steady state.

3. The method according to claim 2, further comprising measuring an active component of the output current.

4. The method according to claim 2, further comprising measuring a distortive reactive power of the output current.

5. The method according to claim 2, further comprising accelerating or decelerating a voltage phasor in order to regulate a distortive reactive power of the output current to zero.

6. The method according to claim 2, further comprising accelerating or decelerating a voltage phasor in order to set a setpoint active power value.

7. The method according to claim 1, further comprising latching the controller in a closed-loop output current control in the first operating mode.

8. The method according to claim 7, wherein the latching occurs after an overload or depending on at least one predetermined criterion.

9. The method according to claim 1, further comprising detecting a phase or an amplitude of an output clamping voltage at the inverter or both the phase and the amplitude.

10. The method according to claim 1, further comprising setting a setpoint power value by closed-loop power control.

11. The method according to claim 10, wherein the closed-loop power control involves accelerating or decelerating a voltage phasor.

12. The method according to claim 1, wherein limiting the output current occurs such that the output current of the inverter equals or falls below a predetermined maximum current.

13. An apparatus comprising:
- an inverter having an input coupled to a wind power installation, and an output coupled to a three-phase electrical power supply grid;
- a controller coupled to the inverter and configured to cause the inverter to inject electrical energy into the three-phase electrical power supply grid, wherein the controller is configured to:
    - operate the inverter in a first operating mode for generating an output current, wherein the inverter in the first operating mode applies an output current to the three-phase electrical power supply grid such that the inverter controls the voltage of the three-phase electrical power supply grid by applying the output current having a particular amplitude, a particular phase angle, and a particular frequency to the three-phase electrical power supply grid;
    - detect a grid fault on the three-phase electrical power supply grid during the first operating mode;
    - in response to detecting the grid fault, continue to operate in the first operating mode and limit the output current of the inverter by current limitation, wherein limiting the output current comprises generating the output current dynamically by a reference system; and
    - set a voltage reference system to a detected output clamping voltage.

14. The apparatus according to claim 13, wherein the output current is limited such that the output current of the inverter falls below a predetermined maximum current or substantially corresponds thereto.

15. A wind power installation or an electrical store comprising the apparatus according to claim 13.

* * * * *